(12) United States Patent
Kakimoto et al.

(10) Patent No.: US 12,030,560 B2
(45) Date of Patent: Jul. 9, 2024

(54) STEERING CONTROL DEVICE AND STEERING SYSTEM

(71) Applicants: JTEKT CORPORATION, Kariya (JP); TOYOTA JIDOSHA KABUSHIKI KAISHA, Toyota (JP)

(72) Inventors: Yusuke Kakimoto, Okazaki (JP); Takashi Kodera, Okazaki (JP); Yoshio Kudo, Machida (JP)

(73) Assignees: JTEKT CORPORATION, Kariya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 490 days.

(21) Appl. No.: 17/483,972

(22) Filed: Sep. 24, 2021

(65) Prior Publication Data

US 2022/0097757 A1    Mar. 31, 2022

(30) Foreign Application Priority Data

Sep. 28, 2020  (JP) ................................ 2020-161924

(51) Int. Cl.
*B62D 5/04*        (2006.01)
*B62D 6/00*        (2006.01)

(52) U.S. Cl.
CPC ............. *B62D 5/0463* (2013.01); *B62D 6/00* (2013.01)

(58) Field of Classification Search
CPC ................................ B62D 5/0463; B62D 6/00
See application file for complete search history.

(56) References Cited

U.S. PATENT DOCUMENTS

| 2014/0303850 A1 | 10/2014 | Chai et al. |
| 2016/0229446 A1 | 8/2016 | Tamaizumi et al. |
| 2020/0130730 A1* | 4/2020 | Takase ................ H02P 21/0003 |
| 2020/0283059 A1 | 9/2020 | Kodera et al. |

FOREIGN PATENT DOCUMENTS

| EP | 3 705 383 A1 | 9/2020 | |
| EP | 3705383 A1 * | 9/2020 | ........... B62D 5/0424 |
| JP | 2002-037102 A | 2/2002 | |

(Continued)

OTHER PUBLICATIONS

Feb. 21, 2022 extended Search Report issued in European Patent Application No. 21198716.9.

(Continued)

*Primary Examiner* — Jacob D Knutson
(74) *Attorney, Agent, or Firm* — Oliff PLC

(57) ABSTRACT

A steering control device includes a target torque generator configured to generate a target torque which is a target value of the motor torque and a control signal generator configured to generate a control signal for controlling the motor such that the motor torque corresponding to the target torque is generated. The target torque generator includes a pre-adjustment axial force calculator, a first axial force calculator, a second axial force calculator, a post-adjustment axial force calculator, and a target torque calculator. The post-adjustment axial force calculator is configured to set a proportion of a first axial force contributing to a post-adjustment axial force to be smaller when a state of a vehicle speed is abnormal than when the state of the vehicle speed is normal.

6 Claims, 4 Drawing Sheets

(56) References Cited

FOREIGN PATENT DOCUMENTS

| | | | |
|---|---|---|---|
| JP | 2007-125999 A | 5/2007 | |
| JP | 2016-144974 A | 8/2016 | |
| JP | 2020069864 A * | 5/2020 | ........... B62D 5/0463 |
| JP | 2020-142596 A | 9/2020 | |
| WO | 2013/061567 A1 | 5/2013 | |

OTHER PUBLICATIONS

Dec. 19, 2023 Office Action issued in Japanese Patent Application No. 2020-161924.

* cited by examiner

STEERING CONTROL DEVICE AND STEERING SYSTEM

CROSS-REFERENCE TO RELATED APPLICATION

This application claims priority to Japanese Patent Application No. 2020-161924 filed on Sep. 28, 2020, incorporated herein by reference in its entirety.

BACKGROUND

1. Technical Field

The disclosure relates to a steering control device and a steering system.

2. Description of Related Art

A steer-by-wire steering system in which a power transmission path between a steering unit that is connected to a steering wheel and a turning unit that turns turning wheels is cut off is known. In such a type of steering system, a road-surface reaction force or the like applied to the turning wheels is not mechanically transmitted to the steering wheel. Therefore, a steering control device that controls such a type of steering system calculates a target value of a steering reaction which is applied to the steering wheel in consideration of a road-surface reaction force or the like.

For example, a steering control device described in WO 2013/061567 calculates a plurality of types of calculational axial forces corresponding to an axial force acting on a turning shaft connected to turning wheels based on various state quantities with attention paid to the axial force. The steering control device calculates a target steering reaction force based on a distributed axial force which is obtained by summing the plurality of types of calculational axial forces at distribution proportions which are individually set.

SUMMARY

Some components serving as a base at the time of calculating a target steering reaction force are calculated based on a vehicle speed, for example, like a distributed axial force described in WO 2013/061567. Accordingly, when a detected vehicle speed has an erroneous value, for example, due to an abnormality occurring in a sensor that detects the vehicle speed, the components serving as a base for the target steering reaction force may have abnormal values. As a result, the target steering reaction force may become different from an appropriate value corresponding to a traveling state of the vehicle.

This problem is not limited to a case in which a steer-by-wire steering system that applies a motor torque as a steering reaction force is controlled. For example, as described in Japanese Unexamined Patent Application Publication No. 2016-144974, this problem can be similarly caused when a steering control device that controls an electric power steering system that applies a motor torque as an assist force calculates a component serving as a base for calculating a target value of the assist force based on a vehicle speed.

The disclosure provides a steering control device and a steering system that can prevent a target torque from becoming different from an appropriate value.

According to a first aspect of the disclosure, there is provided a steering control device. The steering control device is configured to control a steering system that changes a steering torque which is required for steering of a steering wheel using a motor torque which is applied from a motor. The steering control device includes a target torque generator configured to generate a target torque which is a target value of the motor torque and a control signal generator configured to generate a control signal for controlling the motor such that the motor torque corresponding to the target torque is generated. The target torque generator includes a pre-adjustment axial force calculator configured to calculate a pre-adjustment axial force corresponding to an axial force acting on a turning shaft to which turning wheels are connected, a first axial force calculator configured to calculate a first axial force by adjusting the pre-adjustment axial force using a vehicle speed, a second axial force calculator configured to calculate a second axial force by adjusting the pre-adjustment axial force without using the vehicle speed, a post-adjustment axial force calculator configured to calculate a post-adjustment axial force based on the first axial force and the second axial force, and a target torque calculator configured to calculate the target torque based on the post-adjustment axial force. The post-adjustment axial force calculator is configured to set a proportion of the first axial force contributing to the post-adjustment axial force to be smaller when a state of the vehicle speed is abnormal than when the state of the vehicle speed is normal.

With this configuration, when the state of the vehicle speed is abnormal, the proportion of the first axial force, which has been adjusted using the vehicle speed, contributing to the post-adjustment axial force decreases. The target torque is calculated based on the post-adjustment axial force of which the proportion of contribution from the first axial force has decreased. Accordingly, it is possible to prevent the target torque from becoming different from an appropriate value corresponding to a traveling state of a vehicle.

In the steering control device, the post-adjustment axial force calculator may be configured to calculate the post-adjustment axial force by summing the first axial force and the second axial force at predetermined distribution proportions which are set individually. The post-adjustment axial force calculator may be configured to set the distribution proportion of the first axial force to be smaller when the state of the vehicle speed is abnormal than when the state of the vehicle speed is normal.

In the steering control device, the post-adjustment axial force calculator may be configured to switch a valid calculation system to a first calculation system or a second calculation system, where the first calculation system is a calculation system including the first axial force calculator and the second calculation system is a calculation system including the second axial force calculator. The post-adjustment axial force calculator may be configured to output the first axial force as the post-adjustment axial force by validating the first calculation system when the state of the vehicle speed is normal. The post-adjustment axial force calculator may be configured to output the second axial force as the post-adjustment axial force by validating the second calculation system when the state of the vehicle speed is abnormal.

In the steering control device, the post-adjustment axial force calculator may be configured to slowly change a value of the post-adjustment axial force from a value of the first axial force to a value of the second axial force at the time of switching of the valid calculation system from the first calculation system to the second calculation system.

With this configuration, when the state of the vehicle speed is abnormal, the value of the post-adjustment axial force changes slowly from the value of the first axial force to the value of the second axial force. Accordingly, in comparison with a case in which the value of the post-adjustment axial force changes immediately from the value of the first axial force to the value of the second axial force when the state of the vehicle speed is abnormal, it is possible to curb rapid change of the post-adjustment axial force. Accordingly, it is possible to curb rapid change of the target torque and to prevent a feeling of steering from becoming worse.

In the steering control device, the first axial force calculator may be configured to adjust the pre-adjustment axial force such that the first axial force is equal to or less than a first upper limit value based on the vehicle speed. The second axial force calculator may be configured to adjust the pre-adjustment axial force such that the second axial force is equal to or less than a second upper limit value.

With this configuration, for example, even when the pre-adjustment axial force becomes excessively large due to an abnormality of a sensor, it is possible to prevent the post-adjustment axial force from becoming excessively large. Accordingly, it is possible to prevent the target torque from being an abnormal value.

According to a second aspect of the disclosure, there is a provided a steering system. The steering system includes a motor, a steering unit to which a steering wheel is connected, a turning unit configured to turn turning wheels, a power transmission path between the steering unit and the turning unit being cut off, and a steering control device. The motor is a steering-side motor that applies a motor torque as a steering reaction force against steering which is input to the steering unit. The steering control device includes a target torque generator configured to generate a target torque which is a target value of the motor torque and a control signal generator configured to generate a control signal for controlling the motor such that the motor torque corresponding to the target torque is generated. The target torque generator includes a pre-adjustment axial force calculator configured to calculate a pre-adjustment axial force corresponding to an axial force acting on a turning shaft to which turning wheels are connected, a first axial force calculator configured to calculate a first axial force by adjusting the pre-adjustment axial force using a vehicle speed, a second axial force calculator configured to calculate a second axial force by adjusting the pre-adjustment axial force without using the vehicle speed, a post-adjustment axial force calculator configured to calculate a post-adjustment axial force based on the first axial force and the second axial force, and a target torque calculator configured to calculate the target torque based on the post-adjustment axial force. The target torque generator is configured to generate a target reaction torque which is a target value of the steering reaction force as the target torque. The post-adjustment axial force calculator is configured to set a proportion of the first axial force contributing to the post-adjustment axial force to be smaller when a state of the vehicle speed is abnormal than when the state of the vehicle speed is normal.

According to the aspects, it is possible to prevent a target torque from becoming different from an appropriate value.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

First Embodiment

Figure 1:
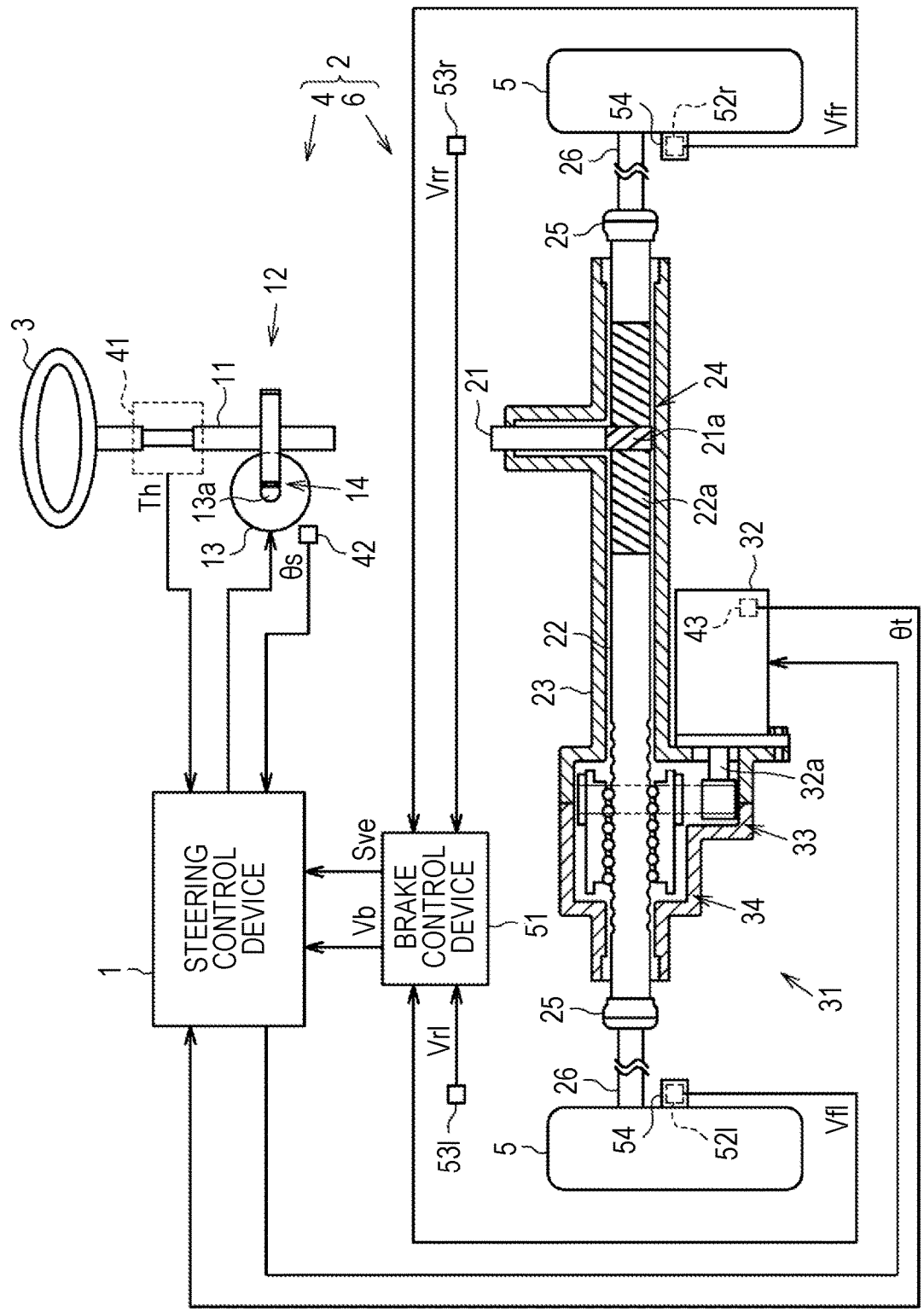
FIG. 1 is a diagram schematically illustrating a configuration of a steering system according to a first embodiment.

Hereinafter, a steering control device according to a first embodiment will be described with reference to the accompanying drawings. As illustrated in FIG. 1, a steering system 2 which is controlled by a steering control device 1 is configured as a steer-by-wire steering system. The steering system 2 includes a steering unit 4 that is steered by a driver using a steering wheel 3 and a turning unit 6 that turns turning wheels 5 according to the driver's steering of the steering unit 4.

The steering unit 4 includes a steering shaft 11 to which the steering wheel 3 is connected and a steering-side actuator 12 that applies a steering reaction force which is a force against steering of the steering wheel 3.

The steering-side actuator 12 includes a steering-side motor 13 and a steering-side reduction gear 14. For example, a three-phase surface permanent magnet synchronous motor is employed as the steering-side motor 13. For example, a worm-and-wheel mechanism is employed as the steering-side reduction gear 14. The steering-side motor 13 is connected to the steering shaft 11 via the steering-side reduction gear 14. Accordingly, a motor torque of the steering-side motor 13 is applied as a steering reaction force to the steering wheel 3 via the steering shaft 11.

The turning unit 6 includes a pinion shaft 21, a rack shaft 22 that is a turning shaft connected to the pinion shaft 21, a rack housing 23 that accommodates the rack shaft 22 such that it can reciprocate, and a rack and pinion mechanism 24 that includes the pinion shaft 21 and the rack shaft 22. The pinion shaft 21 and the rack shaft 22 are arranged at a predetermined crossing angle in the rack housing 23. The rack and pinion mechanism 24 has a configuration in which pinion teeth 21a formed in the pinion shaft 21 and rack teeth 22a formed in the rack shaft 22 engage with each other. Accordingly, the pinion shaft 21 rotates with reciprocation of the rack shaft 22. Tie rods 26 are connected to both ends of the rack shaft 22 via ball joints 25. The tips of the tie rods 26 are connected to knuckles (not illustrated) to which the turning wheels 5 are assembled.

The turning unit 6 includes a turning-side actuator 31 that applies a turning force which is a force for turning the turning wheels 5. The turning-side actuator 31 includes a turning-side motor 32, a transmission mechanism 33, and a conversion mechanism 34. For example, a three-phase surface permanent magnet synchronous motor is employed as the turning-side motor 32. For example, a belt mechanism is employed as the transmission mechanism 33. For example, a ball screw mechanism is employed as the conversion mechanism 34. A motor torque of the turning-side motor 32 is transmitted to the conversion mechanism 34 via the transmission mechanism 33. The conversion mechanism 34 converts the transmitted torque to a translational motion of the rack shaft 22. Accordingly, the turning-side actuator 31 applies a turning force to the turning unit 6.

In the steering system 2 having the aforementioned configuration, a turning force is applied from the turning-side actuator 31 according to a driver's steering operation. Accordingly, the rack shaft 22 is made to reciprocate and a turning angle of the turning wheels 5 is changed. At this time, a steering reaction force against the driver's steering is applied to the steering wheel 3 from the steering-side actuator 12. That is, in the steering system 2, a steering torque Th which is required for steering of the steering wheel 3 is changed according to the motor torque which is applied as a steering reaction force from the steering-side motor 13.

An electrical configuration according to this embodiment will be described below. The steering control device 1 is connected to the steering-side motor 13 and the turning-side motor 32 and operates the steering-side motor 13 and the turning-side motor 32.

The steering control device 1 can be configured as a processing circuit including (1) one or more processors that operate in accordance with a computer program (software), (2) one or more dedicated hardware circuits such as an application-specific integrated circuit (ASIC) that performs at least some of various processes, or (3) a combination thereof. The processor includes a central processing unit (CPU) and memories such as a RAM and a ROM, and the memories store program codes or commands configured to cause the CPU to perform processing. Memories, that is, non-transitory computer-readable media, include all available media that can be accessed by a general-purpose or dedicated computer. Various types of control are performed by the steering control device 1 by causing the CPU to execute a program stored in the memories in each of predetermined operation cycles.

Results of detection from various sensors are input to the steering control device 1. The various sensors include, for example, a torque sensor 41, a steering-side rotation angle sensor 42, and a turning-side rotation angle sensor 43. The torque sensor 41 detects a steering torque Th which is applied to the steering shaft 11. For example, the steering torque Th is detected as a positive value when the steering wheel is steered to the right and is detected as a negative value when the steering wheel is steered to the left. The steering-side rotation angle sensor 42 detects a rotation angle θs of a rotation shaft 13a of the steering-side motor 13 as a relative angle in a range of 360°. The turning-side rotation angle sensor 43 detects a rotation angle θt of a rotation shaft 32a of the turning-side motor 32 as a relative angle.

The steering control device 1 is communicatively connected to a brake control device 51 which is provided outside of the steering control device 1. The brake control device 51 is a device that operates a brake device which is not illustrated. The brake control device 51 calculates a vehicle speed Vb of a vehicle body at the time of activation of the brake device. Specifically, a front-left wheel sensor 52l, a front-right wheel sensor 52r, a rear-left wheel sensor 53l, and a rear-right wheel sensor 53r are connected to the brake control device 51. The front-left wheel sensor 52l and the front-right wheel sensor 52r are provided in a hub unit 54 that rotatably supports the turning wheels 5 via a drive shaft which is not illustrated. The front-left wheel sensor 52l detects a vehicle wheel speed Vfl of the left turning wheel 5, the front-right wheel sensor 52r detects a vehicle wheel speed Vfr of the right turning wheel 5, the rear-left wheel sensor 53l detects a vehicle wheel speed Vrl of a rear-left wheel which is not illustrated, and the rear-right wheel sensor 53r detects a vehicle wheel speed Vrr of a rear-right wheel which is not illustrated. For example, the brake control device 51 calculates an average of the vehicle wheel speeds Vfl, Vfr, Vrl, and Vrr as the vehicle speed Vb. The calculated vehicle speed Vb is output to the steering control device 1.

The brake control device 51 determines whether a state of the detected vehicle speed Vb is normal. For example, when the vehicle wheel speeds Vfl, Vfr, Vrl, and Vrr output from the front-left wheel sensor 52l, the front-right wheel sensor 52r, the rear-left wheel sensor 53l, and the rear-right wheel sensor 53r are unobtainable values or when a change from a previous value is greater than a preset threshold value, the brake control device 51 determines that the state of the vehicle speed Vb is abnormal. For example, when at least one of drive voltages which are supplied to the front-left wheel sensor 52l, the front-right wheel sensor 52r, the rear-left wheel sensor 53l, and the rear-right wheel sensor 53r decreases, the brake control device 51 determines that the state of the vehicle speed Vb is abnormal. The brake control device 51 generates a vehicle speed state signal Sve indicating the result of determination of the state of the vehicle speed Vb. The generated vehicle speed state signal Sve is output to the steering control device 1.

The steering control device 1 controls operations of the steering-side motor 13 and the turning-side motor 32 based on the state quantities input from the sensors and the brake control device 51. The configuration of the steering control device 1 will be described below in more detail.

Figure 2:
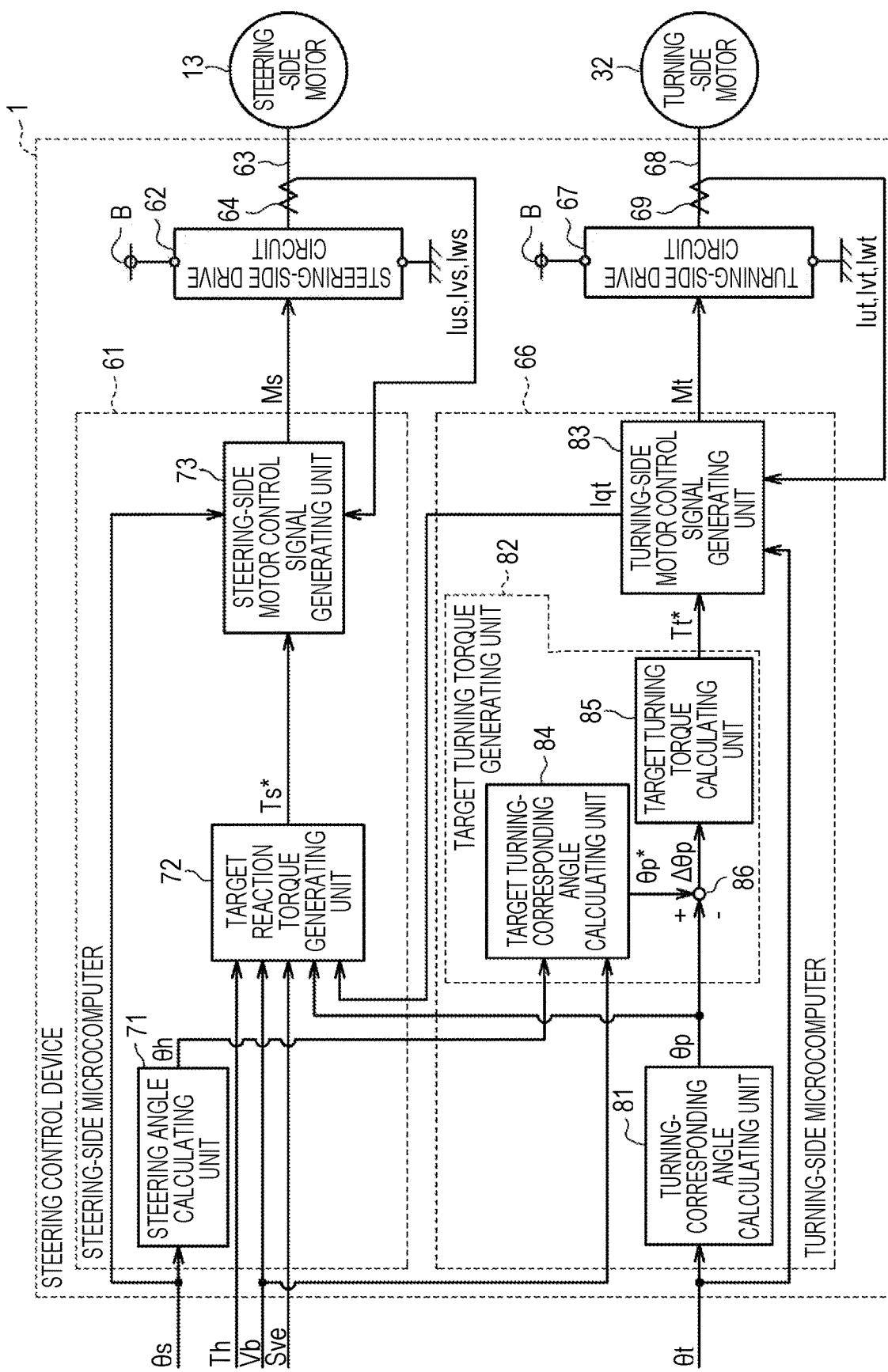
FIG. 2 is a block diagram illustrating a steering control device according to the first embodiment.

As illustrated in FIG. 2, the steering control device 1 includes a steering-side microcomputer 61 that outputs a steering-side motor control signal Ms and a steering-side drive circuit 62 that supplies drive electric power to the steering-side motor 13 based on the steering-side motor control signal Ms. Current sensors 64 which are provided in connection lines 63 between the steering-side drive circuit 62 and phase motor coils of the steering-side motor 13 are connected to the steering-side microcomputer 61. The current sensors 64 detect phase current values Ius, Ivs, and Iws of the steering-side motor 13 which flow in the connection lines 63. In FIG. 2, for the purpose of convenience of description, one of each of the phase connection lines 63 and the phase current sensors 64 is collectively illustrated.

The steering control device 1 includes a turning-side microcomputer 66 that outputs a turning-side motor control signal Mt and a turning-side drive circuit 67 that supplies drive electric power to the turning-side motor 32 based on the turning-side motor control signal Mt. Current sensors 69 which are provided in connection lines 68 between the turning-side drive circuit 67 and phase motor coils of the turning-side motor 32 are connected to the turning-side microcomputer 66. The current sensors 69 detect phase current values Iut, Ivt, and Iwt of the turning-side motor 32 which flow in the connection lines 68. In FIG. 2, for the purpose of convenience of description, one of each of the phase connection lines 68 and the phase current sensors 69 is collectively illustrated.

For example, a known PWM inverter including a plurality of switching elements such as FETs is employed by the steering-side drive circuit 62 and the turning-side drive circuit 67. The steering-side motor control signal Ms and the turning-side motor control signal Mt are gate-on/off signals for prescribing ON/OFF states of the switching elements.

When the steering-side motor control signal Ms is output to the steering-side drive circuit 62, drive electric power from an onboard power source B is supplied to the steering-side motor 13. In this way, the steering control device 1 controls a motor torque which is generated by the steering-side motor 13 by supplying drive electric power to the steering-side motor 13. When the turning-side motor control signal Mt is output to the turning-side drive circuit 67, drive electric power from the onboard power source B is supplied to the turning-side motor 32. In this way, the steering control device 1 controls a motor torque which is generated by the turning-side motor 32 by supplying drive electric power to the turning-side motor 32.

The configuration of the steering-side microcomputer 61 will be described below. The steering-side microcomputer 61 outputs the steering-side motor control signal Ms by performing operation processes indicated by the following control blocks at intervals of a predetermined operation cycle. The steering torque Th, the vehicle speed Vb, the vehicle speed state signal Sve, the rotation angle θs, the phase current values Ius, Ivs, and Iws, a turning-corresponding angle θp which is a rotation angle of the pinion shaft 21 and which will be described later, and a q-axis current value Iqt which is a drive current of the turning-side motor 32 are input to the steering-side microcomputer 61. Then, the steering-side microcomputer 61 outputs the steering-side motor control signal Ms based on these state quantities.

Specifically, the steering-side microcomputer 61 includes a steering angle calculating unit 71 that calculates a steering angle θh of the steering wheel 3, a target reaction torque generating unit 72 that generates a target reaction torque Ts* which is a target value of a steering reaction force, and a steering-side motor control signal generating unit 73 that generates the steering-side motor control signal Ms.

The rotation angle θs of the steering-side motor 13 is input to the steering angle calculating unit 71. The steering angle calculating unit 71 calculates a total angle, for example, by counting the number of rotations of the steering-side motor 13 from a steering midpoint and totaling the rotation angle θs with the steering midpoint as an origin. The steering midpoint is the steering angle θh when the steering wheel 3 is positioned at the center of a steerable range. The steering angle calculating unit 71 calculates the steering angle θh by multiplying a conversion factor based on a rotation speed proportion of the steering-side reduction gear 14 by the total angle. For example, the steering angle θh is calculated as a positive value when it is an angle on the right side of the steering midpoint and is calculated as a negative value when it is an angle on the left side of the steering midpoint. The calculated steering angle θh is output to the turning-side microcomputer 66.

The steering torque Th, the vehicle speed Vb, the vehicle speed state signal Sve, the turning-corresponding angle θp, and the q-axis current value Iqt are input to the target reaction torque generating unit 72. As will be described later, the target reaction torque generating unit 72 generates the target reaction torque Ts* based on the state quantities and outputs the generated target reaction torque Ts* to the steering-side motor control signal generating unit 73. The target reaction torque Ts* corresponds to a target torque of the steering-side motor 13, and the target reaction torque generating unit 72 corresponds to a target torque generator.

In addition to the target reaction torque Ts*, the rotation angle θs and the phase current values Ius, Ivs, and Iws are input to the steering-side motor control signal generating unit 73. The steering-side motor control signal generating unit 73 calculates a d-axis target current value Ids* on a d axis and a q-axis target current value Iqs* on a q axis in a d/q coordinate system based on the target reaction torque Ts*. The d-axis target current value Ids* represents a target current value on the d axis. The q-axis target current value Iqs* represents a target current value on the q axis.

Specifically, the steering-side motor control signal generating unit 73 calculates the q-axis target current value Iqs* such that the absolute value thereof becomes larger as the absolute value of the target reaction torque Ts* becomes larger. In this embodiment, the d-axis target current value Ids* on the d axis is basically set to zero.

The steering-side motor control signal generating unit 73 generates the steering-side motor control signal Ms which is output to the steering-side drive circuit 62 by performing a current feedback operation in the d/q coordinate system. The steering-side motor control signal generating unit 73 performs a PID control operation as an example of the current feedback operation. The word "feedback" may be replaced with "F/B" below.

Specifically, the steering-side motor control signal generating unit 73 calculates the d-axis current value Ids and the q-axis current value Iqs which are actual current values of the steering-side motor 13 in the d/q coordinate system by mapping the phase current values Ius, Ivs, and Iws onto the d/q coordinates based on the rotation angle θs. The steering-side motor control signal generating unit 73 calculates a target voltage value based on current differences on the d axis and the q axis such that the d-axis current value Ids conforms to the d-axis target current value Ids* and the q-axis current value Iqs conforms to the q-axis target current value Iqs*. The steering-side motor control signal generating unit 73 generates the steering-side motor control signal Ms having a duty ratio based on the target voltage value.

The calculated steering-side motor control signal Ms is output to the steering-side drive circuit 62. Accordingly, drive electric power corresponding to the steering-side motor control signal Ms is supplied from the steering-side drive circuit 62 to the steering-side motor 13. The steering-side motor 13 applies a motor torque indicated by the target reaction torque Ts* as a steering reaction force to the steering wheel 3.

The configuration of the turning-side microcomputer 66 will be described below. The turning-side microcomputer 66 outputs the turning-side motor control signal Mt by performing operation processes indicated by the following control blocks at intervals of a predetermined operation cycle. The vehicle speed Vb, the rotation angle θt, the steering angle θh, and the phase current values Iut, Ivt, and Iwt of the turning-side motor 32 are input to the turning-side microcomputer 66. Then, the turning-side microcomputer 66 generates the turning-side motor control signal Mt based on the state quantities and outputs the generated turning-side motor control signal Mt.

Specifically, the turning-side microcomputer 66 includes a turning-corresponding angle calculating unit 81 that calculates a turning-corresponding angle θp, a target turning torque generating unit 82 that generates a target turning torque Tt* which is a target value of the turning force, and a turning-side motor control signal generating unit 83 that generates the turning-side motor control signal Mt.

The rotation angle θt of the turning-side motor 32 is input to the turning-corresponding angle calculating unit 81. The turning-corresponding angle calculating unit 81 calculates a total angle, for example, by counting the number of rotations of the turning-side motor 32 with respect to a turning-corresponding angle midpoint serving as an origin and totaling the rotation angle θt. The turning-corresponding angle midpoint is a rotation angle of the pinion shaft 21 when the vehicle travels straight. The turning-corresponding angle calculating unit 81 calculates the turning-corresponding angle θp by multiplying a conversion factor based on a reduction ratio of the transmission mechanism 33, a lead of the conversion mechanism 34, and a rotation speed proportion of the rack and pinion mechanism 24 by the total angle. That is, the turning-corresponding angle θp corresponds to a pinion angle which is a rotation angle of the pinion shaft 21. The calculated turning-corresponding angle θp is output to the target reaction torque generating unit 72 and the target turning torque generating unit 82.

The vehicle speed Vb, the steering angle θh, and the turning-corresponding angle θp are input to the target turning torque generating unit 82. The target turning torque generating unit 82 includes a target turning-corresponding angle calculating unit 84 that calculates a target turning-corresponding angle θp* which is a target value of the turning-corresponding angle θp and a target turning torque calculating unit 85 that calculates a target turning torque Tt*.

Specifically, the vehicle speed Vb and the steering angle θh are input to the target turning-corresponding angle calculating unit 84. The target turning-corresponding angle calculating unit 84 calculates the target turning-corresponding angle θp* based on the vehicle speed Vb and the steering angle θh. For example, the target turning-corresponding angle calculating unit 84 calculates the target turning-corresponding angle θp* by dividing the steering angle θh by a transmission ratio which changes depending on the steering angle θh and the vehicle speed Vb. That is, the steering control device 1 according to this embodiment changes a steering angle ratio which is a ratio of the turning-corresponding angle θp to the steering angle θh according to the vehicle speed.

An angle difference Δθp which is acquired from a subtractor 86 by subtracting the turning-corresponding angle θp from the target turning-corresponding angle θp* is input to the target turning torque calculating unit 85. The target turning torque calculating unit 85 calculates the target turning torque Tt* by performing an angle F/B operation of causing the turning-corresponding angle θp to conform to the target turning-corresponding angle θp*. The target turning torque calculating unit 85 performs a PID control operation as an example of the angle F/B operation. The calculated target turning torque Tt* is output to the turning-side motor control signal generating unit 83.

In addition to the target turning torque Tt*, the rotation angle θt and the phase current values Iut, Ivt, and Iwt are input to the turning-side motor control signal generating unit 83. The turning-side motor control signal generating unit 83 calculates the d-axis target current value Idt* on the d axis and the q-axis target current value Iqt* on the q axis in the d/q coordinate system based on the target turning torque Tt*. Specifically, the turning-side motor control signal generating unit 83 calculates the q-axis target current value Iqt* such that the absolute value thereof increases as the absolute value of the target turning torque Tt* increases. In this embodiment, the d-axis target current value Idt* on the d axis is basically set to zero. Similarly to the steering-side motor control signal generating unit 73, the turning-side motor control signal generating unit 83 generates the turning-side motor control signal Mt which is output to the turning-side drive circuit 67 by performing current F/B control in the d/q coordinate system. The q-axis current value Iqt which is calculated in the process of generating the turning-side motor control signal Mt is output to the target reaction torque generating unit 72.

The calculated turning-side motor control signal Mt is output to the turning-side drive circuit 67. Accordingly, drive electric power corresponding to the turning-side motor control signal Mt is supplied to the turning-side motor 32 from the turning-side drive circuit 67. Then, the turning-side motor 32 applies a motor torque indicated by the target turning torque Tt* as a turning force to the turning wheels 5.

Figure 3:
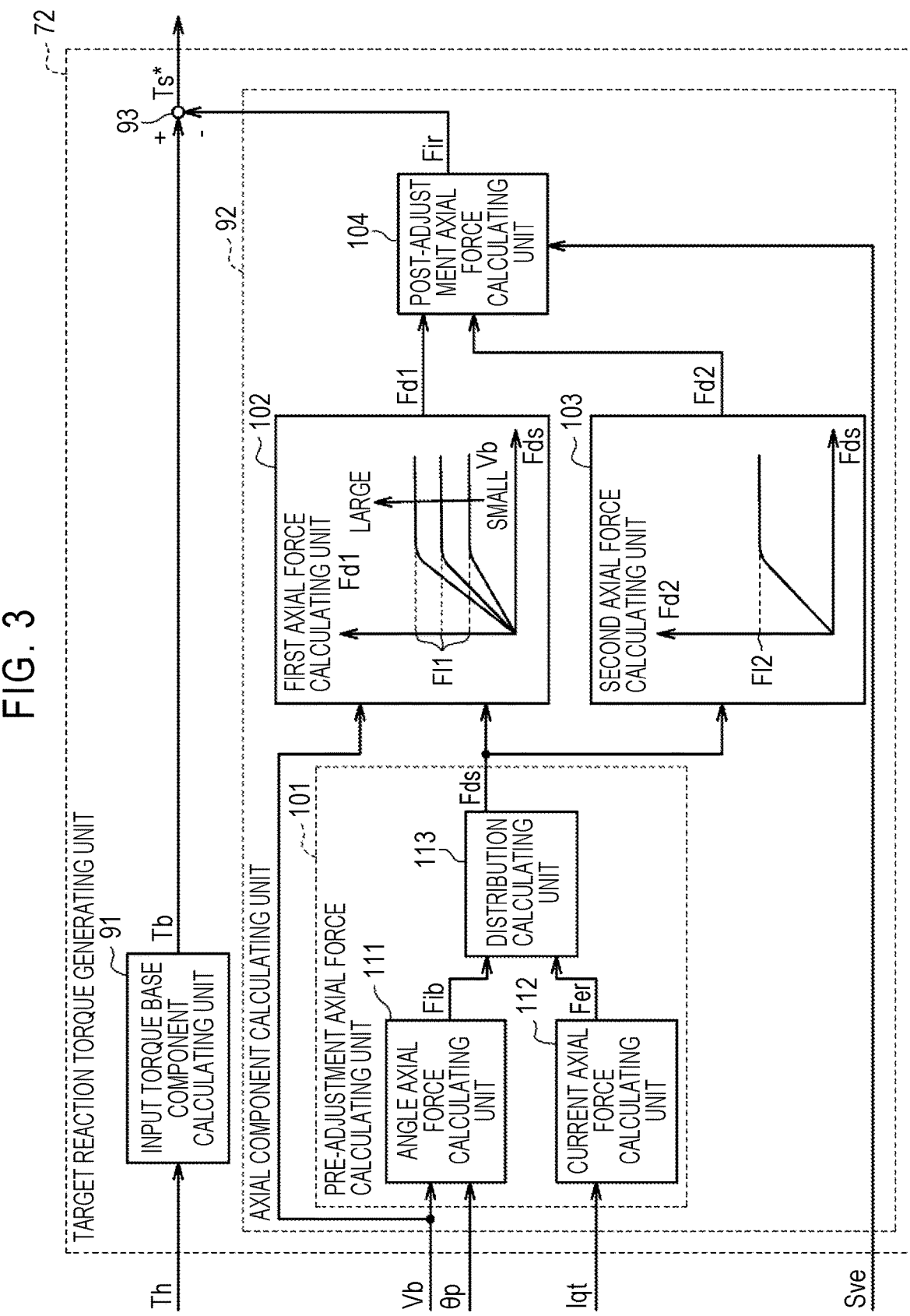
FIG. 3 is a block diagram illustrating a target reaction torque generating unit according to the first embodiment.

The configuration of the target reaction torque generating unit 72 will be described below. As illustrated in FIG. 3, the target reaction torque generating unit 72 includes an input torque base component calculating unit 91 that calculates an input torque base component Tb, an axial component calculating unit 92 that calculates a post-adjustment axial force Fir which will be described later as an axial component, and a subtractor 93 that is a target torque calculator. The input torque base component Tb is a force for rotating the steering wheel 3 in a driver's steering direction. The post-adjustment axial force Fir is a force against rotation of the steering wheel 3 which is steered by a driver, that is, an axial force which acts on the rack shaft 22 from the turning wheels 5.

Specifically, the steering torque Th is input to the input torque base component calculating unit 91. The input torque base component calculating unit 91 calculates the input torque base component Tb such that the absolute value thereof increases as the absolute value of the steering torque Th increases. The calculated input torque base component Tb is output to the subtractor 93.

The q-axis current value Iqt of the turning-side motor 32, the turning-corresponding angle θp, the vehicle speed Vb, the vehicle speed state signal Sve are input to the axial component calculating unit 92. The axial component calculating unit 92 calculates a post-adjustment axial force Fir corresponding to an axial force acting on the rack shaft 22 based on the state quantities as will be described later. The post-adjustment axial force Fir corresponds to a calculational axial force which is obtained by estimating the axial force acting on the rack shaft 22. The calculated post-adjustment axial force Fir is output to the subtractor 93.

The subtractor 93 calculates a target reaction torque Ts* by subtracting the post-adjustment axial force Fir which is an axial component from the input torque base component Tb. The calculated target reaction torque Ts* is output to the steering-side motor control signal generating unit 73.

As described above, the target reaction torque generating unit 72 calculates the target reaction torque Ts* based on the post-adjustment axial force Fir which is a calculational axial force. Accordingly, a steering reaction force which is applied from the steering-side motor 13 is basically a force against a driver's steering, but may serve as a force for assisting with a driver's steering depending on a difference between the calculational axial force and the actual axial force acting on the rack shaft 22.

The axial component calculating unit 92 will be described below. The axial component calculating unit 92 includes a pre-adjustment axial force calculating unit 101, a first axial force calculating unit 102, a second axial force calculating unit 103, and a post-adjustment axial force calculating unit 104.

Specifically, the q-axis current value Iqt of the turning-side motor 32, the turning-corresponding angle θp, and the vehicle speed Vb are input to the pre-adjustment axial force calculating unit 101. The pre-adjustment axial force calculating unit 101 calculates a pre-adjustment axial force Fds based on the state quantities. The pre-adjustment axial force Fds is a calculation axial force corresponding to an axial force acting on the rack shaft 22. The pre-adjustment axial force calculating unit 101 according to this embodiment calculates a distributed axial force which is obtained by summing a plurality of types of calculational axial forces at predetermined distribution proportions which are set individually as the pre-adjustment axial force Fds.

Specifically, the pre-adjustment axial force calculating unit 101 includes an angle axial force calculating unit 111 that calculates an angle axial force Fib and a current axial force calculating unit 112 that calculates a current axial force Fer. The dimensions of the angle axial force Fib and the current axial force Fer are, for example, a torque (N·m) around the pinion shaft. The pre-adjustment axial force calculating unit 101 includes a distribution calculating unit 113 that sums the angle axial force Fib and the current axial force Fer at the predetermined distribution proportions which are set individually.

The turning-corresponding angle $\theta p$ and the vehicle speed Vb are input to the angle axial force calculating unit 111. The angle axial force calculating unit 111 calculates the angle axial force Fib based on the turning-corresponding angle $\theta p$ and the vehicle speed Vb. The angle axial force Fib is an ideal value of an axial force in a preset model. Accordingly, the angle axial force Fib does not include road surface information such as fine unevenness not affecting behavior in the lateral direction of the vehicle or a stepped portion affecting behavior in the lateral direction of the vehicle.

Specifically, the angle axial force calculating unit 111 calculates the angle axial force Fib such that the absolute value thereof increases as the absolute value of the turning-corresponding angle $\theta p$ increases. The angle axial force calculating unit 111 calculates the angle axial force Fib such that the absolute value thereof increases as the vehicle speed Vb increases. The calculated angle axial force Fib is output to a distribution calculating unit 113.

The q-axis current value Iqt of the turning-side motor 32 is input to the current axial force calculating unit 112. The current axial force calculating unit 112 calculates the axial force acting on the rack shaft 22 via the turning wheels 5 based on the q-axis current value Iqt. The current axial force Fer is an estimated value of the axial force acting on the rack shaft 22. The current axial force Fer is a road-surface axial force including road surface information.

Specifically, the current axial force calculating unit 112 calculates the current axial force Fer based on the assumption that the torque applied to the rack shaft 22 by the turning-side motor 32 and the torque corresponding to a force applied to the turning wheels 5 from a road surface are balanced. The current axial force calculating unit 112 calculates the current axial force Fer such that the absolute value thereof increases as the absolute value of the q-axis current value Iqt increases. The calculated current axial force Fer is output to the distribution calculating unit 113.

The angle axial force Fib and the current axial force Fer are input to the distribution calculating unit 113. In the distribution calculating unit 113, an angle distribution gain Gib and a current distribution gain Ger are set in advance based on results of experiment or the like. The angle distribution gain Gib represents a distribution proportion of the angle axial force Fib in the pre-adjustment axial force Fds. The current distribution gain Ger represents a distribution proportion of the current axial force Fer in the pre-adjustment axial force Fds. The distribution calculating unit 113 calculates an angle axial force distribution value by multiplying the angle axial force Fib by the angle distribution gain Gib, and calculates a current axial force distribution value by multiplying the current axial force Fer by the current distribution gain Ger. The distribution calculating unit 113 calculates the pre-adjustment axial force Fds by summing the distribution values. The calculated pre-adjustment axial force Fds is output to the first axial force calculating unit 102 and the second axial force calculating unit 103.

The pre-adjustment axial force Fds and the vehicle speed Vb are input to the first axial force calculating unit 102. The first axial force calculating unit 102 calculates a first axial force Fd1, for example, by adjusting the pre-adjustment axial force Fds using the vehicle speed Vb for the purpose of improvement in a feeling of steering. The first axial force calculating unit 102 according to this embodiment includes a first map in which a relationship between an absolute value of the pre-adjustment axial force Fds and the vehicle speed Vb and an absolute value of the first axial force Fd1 is defined. That is, the first axial force calculating unit 102 adjusts the pre-adjustment axial force Fds based on the absolute value of the pre-adjustment axial force Fds and the vehicle speed Vb.

In the first map, the absolute value of the first axial force Fd1 is set to zero when the absolute value of the pre-adjustment axial force Fds is zero. In the first map, the absolute value of the first axial force Fd1 is set to increase linearly with an increase of the absolute value of the pre-adjustment axial force Fds. In the first map, when the absolute value of the pre-adjustment axial force Fds is equal to or greater than a certain value, the absolute value of the first axial force Fd1 is set to be fixed to a first upper limit value Fl1 in spite of an increase of the absolute value of the pre-adjustment axial force Fds. That is, the first map has a guard function of limiting an upper limit value of the first axial force Fd1. The first map is set such that the absolute value of the first axial force Fd1 increases with an increase of the vehicle speed Vb. That is, the first upper limit value Fl1 changes according to the vehicle speed Vb.

The first axial force calculating unit 102 calculates the absolute value of the first axial force Fd1 based on the pre-adjustment axial force Fds and the vehicle speed Vb with reference to the first map. The first axial force calculating unit 102 calculates a component with the absolute value acquired through map calculation and with the same sign as the pre-adjustment axial force Fds as the first axial force Fd1. The calculated first axial force Fd1 is output to the post-adjustment axial force calculating unit 104.

The pre-adjustment axial force Fds is input to the second axial force calculating unit 103. The second axial force calculating unit 103 calculates a second axial force Fd2, for example, by adjusting the pre-adjustment axial force Fds without using the vehicle speed Vb for the purpose of improvement in a feeling of steering. The second axial force calculating unit 103 according to this embodiment includes a second map in which a relationship between the absolute value of the pre-adjustment axial force Fds and the absolute value of the second axial force Fd2 is defined. That is, the second axial force calculating unit 103 adjusts the pre-adjustment axial force Fds based on the absolute value of the pre-adjustment axial force Fds.

In the second map, the relationship between the absolute value of the pre-adjustment axial force Fds and the absolute value of the second axial force Fd2 is set to be substantially the same as the relationship between the absolute value of the pre-adjustment axial force Fds and the absolute value of the first axial force Fd1 at a predetermined vehicle speed in the first map. That is, in the second map, the absolute value of the second axial force Fd2 is set to zero when the absolute value of the pre-adjustment axial force Fds is zero. In the second map, the absolute value of the second axial force Fd2 is set to increase linearly with an increase of the absolute value of the pre-adjustment axial force Fds. In the second map, when the absolute value of the pre-adjustment axial force Fds is equal to or greater than a certain value, the absolute value of the second axial force Fd2 is set to be fixed to a second upper limit value Fl2 in spite of an increase of the absolute value of the pre-adjustment axial force Fds. That is, the second map has a guard function of limiting an upper limit value of the second axial force Fd2. For example, the predetermined vehicle speed is set to a speed at which the absolute value of the second axial force Fd2 is not an excessively large or small value in a wide vehicle speed area.

The second axial force calculating unit 103 calculates the absolute value of the second axial force Fd2 based on the pre-adjustment axial force Fds with reference to the second map. The second axial force calculating unit 103 calculates a component with the absolute value acquired through map calculation and with the same sign as the pre-adjustment axial force Fds as the second axial force Fd2. The calculated second axial force Fd2 is output to the post-adjustment axial force calculating unit 104.

In addition to the first axial force Fd1 and the second axial force Fd2, the vehicle speed state signal Sve is input to the post-adjustment axial force calculating unit 104. The post-adjustment axial force calculating unit 104 calculates the post-adjustment axial force Fir based on the state quantities. The post-adjustment axial force calculating unit 104 according to this embodiment calculates a value which is obtained by summing the first axial force Fd1 and the second axial force Fd2 at predetermined distribution proportions which are set individually as the post-adjustment axial force Fir.

Specifically, in the post-adjustment axial force calculating unit 104, a first distribution gain G1 and a second distribution gain G2 are set in advance based on results of experiment or the like. The first distribution gain G1 represents a distribution proportion of the first axial force Fd1 in the post-adjustment axial force Fir. The second distribution gain G2 represents a distribution proportion of the second axial force Fd2 in the post-adjustment axial force Fir.

Here, the post-adjustment axial force calculating unit 104 changes the first distribution gain G1 and the second distribution gain G2 based on the state of the vehicle speed Vb. When the vehicle speed state signal Sve indicates that the state of the vehicle speed Vb is normal, the post-adjustment axial force calculating unit 104 sets the value of the first distribution gain G1 as a first normality gain G1n and sets the value of the second distribution gain G2 as a second normality gain G2n. The first normality gain G1n is, for example, "0.5" and the second normality gain G2n is, for example, "0.5."

When the vehicle speed state signal Sve indicates that the state of the vehicle speed Vb is abnormal, the post-adjustment axial force calculating unit 104 sets the value of the first distribution gain G1 as a first abnormality gain G1a and sets the value of the second distribution gain G2 as a second abnormality gain G2a. The first abnormality gain G1a is, for example, "0" and the second abnormality gain G2a is, for example, "1." That is, the post-adjustment axial force calculating unit 104 sets the distribution proportion of the first axial force Fd1 to be smaller when the state of the vehicle speed Vb is abnormal than when the state of the vehicle speed Vb is normal. Accordingly, the proportion of the first axial force Fd1 in the post-adjustment axial force Fir is smaller when the state of the vehicle speed Vb is abnormal than when the state of the vehicle speed Vb is normal.

The post-adjustment axial force calculating unit 104 calculates a first axial force distribution value by multiplying the first axial force Fd1 by the first distribution gain G1 which is set based on the state of the vehicle speed Vb as described above. The post-adjustment axial force calculating unit 104 calculates a second axial force distribution value by multiplying the second axial force Fd2 by the second distribution gain G2 which is set based on the state of the vehicle speed Vb as described above. Then, the post-adjustment axial force calculating unit 104 calculates the post-adjustment axial force Fir by summing the distribution values. The calculated post-adjustment axial force Fir is output as an axial component to the subtractor 93 as described above.

Operations and advantages of this embodiment will be described below. The post-adjustment axial force calculating unit 104 sets the proportion of the first axial force Fd1 in the post-adjustment axial force Fir to be smaller when the state of the vehicle speed Vb is abnormal than when the state of the vehicle speed Vb is normal. Accordingly, when the state of the vehicle speed Vb is abnormal, the proportion of the first axial force Fd1, which has been adjusted using the vehicle speed Vb, contributing to the post-adjustment axial force Fir decreases. The target reaction torque Ts* is calculated based on the post-adjustment axial force Fir to which the proportion of the first axial force Fd1 contributing has decreased. Accordingly, it is possible to prevent the target reaction torque Ts* from becoming different from an appropriate value corresponding to the traveling state of the vehicle.

The first axial force calculating unit 102 adjusts the pre-adjustment axial force Fds such that the first axial force Fd1 is equal to or less than the first upper limit value Fl1 corresponding to the vehicle speed Vb. The second axial force calculating unit 103 adjusts the pre-adjustment axial force Fds such that the second axial force Fd2 is equal to or less than the second upper limit value Fl2. Accordingly, for example, even when the pre-adjustment axial force Fds becomes excessively large due to an excessive increase of the current axial force Fer due to an abnormality of the current sensor 69, it is possible to prevent the post-adjustment axial force Fir from becoming excessively large. Accordingly, it is possible to prevent the target reaction torque Ts* from becoming an abnormal value.

Second Embodiment

A steering control device according to a second embodiment will be described below with reference to the drawings. For the purpose of convenience of description, the same elements will be referred to by the same reference signs as in the first embodiment and description thereof will be omitted.

Figure 4:
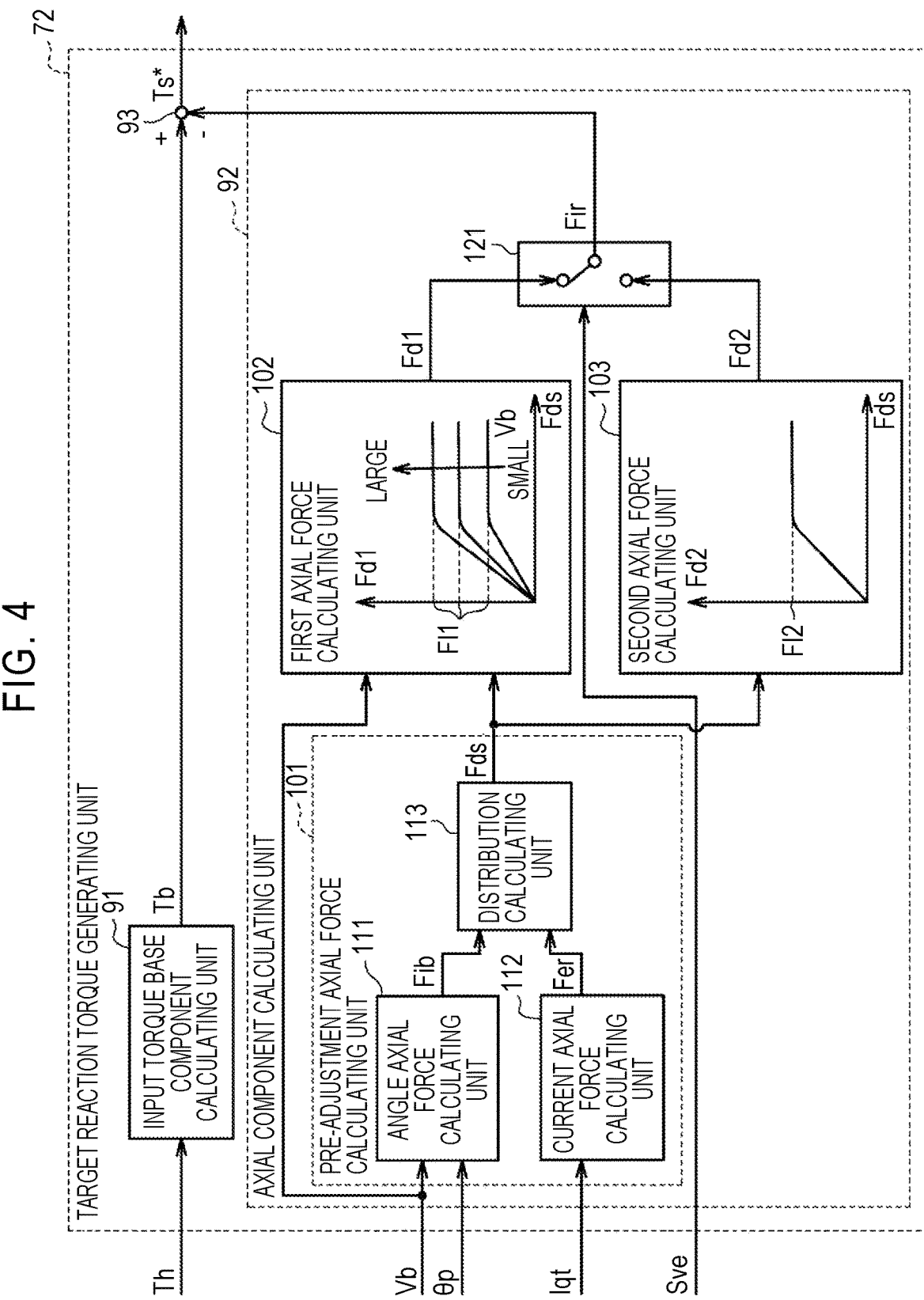
FIG. 4 is a block diagram illustrating a target reaction torque generating unit according to a second embodiment.

As illustrated in FIG. 4, a post-adjustment axial force calculating unit 121 according to this embodiment outputs the first axial force Fd1 or the second axial force Fd2 as the post-adjustment axial force Fir which is an axial component by switching a valid calculation system to a first calculation system or a second calculation system. The first calculation system is a calculation system that calculates the first axial force Fd1, and includes the pre-adjustment axial force calculating unit 101 and the first axial force calculating unit 102. The second calculation system is a calculation system that calculates the second axial force Fd2, and includes the pre-adjustment axial force calculating unit 101 and the second axial force calculating unit 103.

Specifically, the post-adjustment axial force calculating unit 121 outputs the first axial force Fd1 as the post-adjustment axial force Fir by validating the first calculation system when the vehicle speed state signal Sve indicates that the state of the vehicle speed Vb is normal. On the other hand, when the vehicle speed state signal Sve indicates that the state of the vehicle speed Vb is abnormal, the post-adjustment axial force calculating unit 121 outputs the second axial force Fd2 as the post-adjustment axial force Fir by validating the second calculation system. That is, when the state of the vehicle speed Vb is abnormal, the post-adjustment axial force calculating unit 121 switches the value of the post-adjustment axial force Fir from the value of the first axial force Fd1 to the value of the second axial force Fd2. Accordingly, when the state of the vehicle speed Vb is abnormal, the first axial force Fd1 does not affect the post-adjustment axial force Fir. That is, when the state of the vehicle speed Vb is abnormal, the proportion of the first axial force Fd1 in the post-adjustment axial force Fir decreases.

The post-adjustment axial force calculating unit 121 according to this embodiment slowly changes the value of the post-adjustment axial force Fir from the value of the first axial force Fd1 to the value of the second axial force Fd2 when the valid calculation system is switched from the first calculation system to the second calculation system because the state of the vehicle speed Vb changes from normality to abnormality.

For example, the post-adjustment axial force calculating unit 121 calculates a difference by subtracting the second axial force Fd2 from the first axial force Fd1 which is acquired in a calculation cycle in which the valid calculation system is switched from the first calculation system to the second calculation system. The post-adjustment axial force calculating unit 121 calculates a compensation value such that an absolute value decreases slowly based on the difference and the steering speed. The post-adjustment axial force calculating unit 121 outputs a value obtained by adding the compensation value to the second axial force Fd2 as the post-adjustment axial force Fir. That is, when the compensation value is zero, the value of the post-adjustment axial force Fir is the same as the value of the second axial force Fd2.

According to this embodiment, in addition to the same operations and advantages as the operations and advantages of the first embodiment, the following operations and advantages are achieved. The post-adjustment axial force calculating unit 121 slowly changes the value of the post-adjustment axial force Fir which is an axial component from the value of the first axial force Fd1 to the value of the second axial force Fd2 at the time of switching the valid calculation system from the first calculation system to the second calculation system. Accordingly, in comparison with a case in which the value of the post-adjustment axial force Fir changes immediately from the value of the first axial force Fd1 to the value of the second axial force Fd2 when the state of the vehicle speed Vb is abnormal, it is possible to curb rapid change of the post-adjustment axial force Fir. Accordingly, it is possible to curb rapid change of the target reaction torque Ts* and to prevent a feeling of steering from becoming worse.

The aforementioned embodiments can be modified as follows. The aforementioned embodiments and the following modified examples can be combined unless technical conflictions arise. In the aforementioned embodiments, the average value of the wheel speeds Vfl, Vfr, Vrl, and Vrr is used as the vehicle speed Vb, but the disclosure is not limited thereto and, for example, an average of the second and third highest wheel speeds out of the wheel speeds Vfl, Vfr, Vrl, and Vrr may be used and the method of calculating the vehicle speed Vb can be appropriately modified. Instead of using the wheel speeds, for example, a value obtained by integrating a longitudinal acceleration of the vehicle may be used as the vehicle speed Vb. For example, positioning signals from global positioning system (GPS) satellites may be received and an estimated vehicle speed which is estimated from change in position of the vehicle per unit time based on the received positioning signals may be used as the vehicle speed Vb.

In the aforementioned embodiments, the steering control device 1 may calculate the vehicle speed Vb based on the wheel speeds Vfl, Vfr, Vrl, and Vrr. In the aforementioned embodiments, the input torque base component calculating unit 91 may calculate the input torque base component Tb, for example, based on the steering torque Th and the vehicle speed Vb. In this case, for example, the input torque base component calculating unit 91 calculates the input torque base component Tb such that the absolute value thereof increases as the vehicle speed Vb decreases. When the vehicle speed state signal Sve indicating that the vehicle speed Vb is abnormal is input, it is preferable that the input torque base component calculating unit 91 determine that the vehicle speed Vb is a predetermined vehicle speed which is set in advance and calculate the input torque base component Tb based on the steering torque Th. The predetermined vehicle speed is set to a speed at which the input torque base component Tb does not have an excessively large value or an excessively small value with change of the steering torque Th.

In the aforementioned embodiments, the first map of the first axial force calculating unit 102 is set such that the absolute value of the first axial force Fd1 is equal to or less than the first upper limit value Fl1, but the disclosure is not limited thereto. For example, instead of setting the first upper limit value Fl1 in the first map, the absolute value of the first axial force Fd1 may be set to be larger than the first upper limit value Fl1 in proportion to the absolute value of the pre-adjustment axial force Fds. Similarly, instead of setting the second supper limit value Fl2 in the second map of the second axial force calculating unit 103, the absolute value of the second axial force Fd2 may be set to be larger than the second upper limit value Fl2 in proportion to the absolute value of the pre-adjustment axial force Fds.

In the aforementioned embodiments, the first axial force calculating unit 102 calculates the first axial force Fd1 by adjusting the pre-adjustment axial force Fds through map calculation, but the disclosure is not limited thereto. The first axial force calculating unit 102 may calculate the first axial force Fd1 by adjusting the pre-adjustment axial force Fds, for example, through calculation using a predetermined function expression. Similarly, the second axial force calculating unit 103 may calculate the second axial force Fd2 by adjusting the pre-adjustment axial force Fds, for example, through calculation using a predetermined function expression.

In the aforementioned embodiments, the first axial force calculating unit 102 adjusts the pre-adjustment axial force Fds based on the absolute value of the pre-adjustment axial force Fds and the vehicle speed Vb, but the disclosure is not limited thereto. The first axial force calculating unit 102 may adjust the pre-adjustment axial force Fds in consideration of another state quantity as long as it includes the vehicle speed Vb. The second axial force calculating unit 103 may adjust the pre-adjustment axial force Fds without using the vehicle speed Vb and adjust the pre-adjustment axial force Fds in consideration of a state quantity other than the absolute value of the pre-adjustment axial force Fds.

In the aforementioned embodiments, the distributed axial force obtained by summing the angle axial force Fib and the current axial force Fer at predetermined distribution proportions is used as the pre-adjustment axial force Fds, but the disclosure is not limited thereto. For example, a distributed axial force which is obtained by distributing calculational axial forces other than the angle axial force Fib and the current axial force Fer may be used as the pre-adjustment axial force Fds. The other calculational axial forces include, for example, a vehicle state quantity axial force based on the vehicle speed Vb and a lateral acceleration and a yaw rate of a vehicle, a sensor axial force based on a detection value from an axial force sensor that detects an axial force acting on the rack shaft 22, and a tire axial force based on tire forces detected by a tire force sensor. The vehicle state quantity axial force does not include road surface information which does not causing change of behavior in the lateral direction of the vehicle and includes road surface information which can be transmitted by change of behavior in the lateral direction of the vehicle. The sensor axial force and the tire axial force are road-surface axial forces including road surface information. Instead of using the distributed axial forces as the pre-adjustment axial force Fds, for example, a single calculational axial force such as the current axial force Fer may be used as the pre-adjustment axial force Fds.

In the first embodiment, the first abnormality gain G1$a$ is set to "0," but the disclosure is not limited thereto. The value of the first abnormality gain G1$a$ can be appropriately changed as long as it has a value less than the first normality gain G1$n$.

In the first embodiment, when the state of the vehicle speed Vb becomes abnormal, the value of the first distribution gain G1 may be slowly changed from the first normality gain G1$n$ to the first abnormality gain G1$a$. Similarly, the value of the second distribution gain G2 may be slowly changed from the second normality gain G2$n$ to the second abnormality gain G2$a$.

In the second embodiment, a calculation mode in which the value of the post-adjustment axial force Fir is slowly changed from the value of the first axial force Fds1 to the value of the second axial force Fds2 can be appropriately modified. For example, a compensation value which is added to the second axial force Fds2 may be slowly decreased with the elapse of time after the state of the vehicle speed Vb changes from the normal state to the abnormal state.

In the second embodiment, the post-adjustment axial force calculating unit 121 may immediately change the value of the post-adjustment axial force Fir from the value of the first axial force Fds1 to the value of the second axial force Fds2 when the valid calculation system is switched from the first calculation system to the second calculation system.

In the aforementioned embodiments, the axial component calculating unit 92 may calculate a value obtained by adding another axial force to the post-adjustment axial force Fir as the axial component. For example, an end axial force for restricting further turning steering when the absolute value of the steering angle of the steering wheel 3 approaches a steering angle threshold value can be employed as such another axial force.

In the aforementioned embodiments, the current axial force Fer is calculated based on the q-axis current value Iqt, but the disclosure is not limited thereto and, for example, the current axial force Fer may be calculated based on the q-axis target current value Iqt*. In the aforementioned embodiments, the angle axial force Fib is calculated based on the turning-corresponding angle θp, but the disclosure is not limited thereto and, for example, the angle axial force Fib may be calculated based on the target turning-corresponding angle θp* or the steering angle θh or may be calculated using another method such as considering another parameter such as the steering torque Th.

In the aforementioned embodiments, the steering system 2 which is to be controlled employs a linkless structure in which transmission of power between the steering unit 4 and the turning unit 6 is cut off, but the disclosure is not limited thereto and a steering system with a structure in which transmission of power between the steering unit 4 and the turning unit 6 is cut off by a clutch may be controlled.

In the aforementioned embodiments, a steer-by-wire steering system 2 is controlled, but the disclosure is not limited thereto. For example, an electric power steering system that includes a steering mechanism for turning the turning wheels 5 based on an operation of the steering wheel 3 and applies a motor torque for assisting with the operation of the steering wheel 3 as an assist force may be controlled. In such a steering system, the steering torque Th which is required for steering of the steering wheel 3 is changed by the motor torque which is applied as an assist force. In this case, the steering control device calculates a target assist torque which is a target value of the assist force based on the axial component.

What is claimed is:

1. A steering control device configured to control a steering system that changes a steering torque which is required for steering of a steering wheel using a motor torque which is applied from a motor, the steering control device comprising:
   a target torque generator configured to generate a target torque which is a target value of the motor torque; and
   a control signal generator configured to generate a control signal for controlling the motor such that the motor torque corresponding to the target torque is generated,
   wherein the target torque generator includes a pre-adjustment axial force calculator configured to calculate a pre-adjustment axial force corresponding to an axial force acting on a turning shaft to which turning wheels are connected, a first axial force calculator configured to calculate a first axial force by adjusting the pre-adjustment axial force using a vehicle speed, a second axial force calculator configured to calculate a second axial force by adjusting the pre-adjustment axial force without using the vehicle speed, a post-adjustment axial force calculator configured to calculate a post-adjustment axial force based on the first axial force and the second axial force, and a target torque calculator configured to calculate the target torque based on the post-adjustment axial force, and
   wherein the post-adjustment axial force calculator is configured to set a proportion of the first axial force contributing to the post-adjustment axial force to be smaller when a state of the vehicle speed is abnormal than when the state of the vehicle speed is normal.

2. The steering control device according to claim 1, wherein the post-adjustment axial force calculator is configured to calculate the post-adjustment axial force by summing the first axial force and the second axial force at predetermined distribution proportions which are set individually, and
   wherein the post-adjustment axial force calculator is configured to set the distribution proportion of the first axial force to be smaller when the state of the vehicle speed is abnormal than when the state of the vehicle speed is normal.

3. The steering control device according to claim 1, wherein the post-adjustment axial force calculator is configured to switch a valid calculation system to a first calculation system or a second calculation system, the first calculation system being a calculation system including the first axial force calculator and the second calculation system being a calculation system including the second axial force calculator, wherein the post-adjustment axial force calculator is configured to output the first axial force as the post-adjustment axial force by validating the first calculation system when the state of the vehicle speed is normal, and wherein the post-adjustment axial force calculator is configured to output the second axial force as the post-adjustment axial force by validating the second calculation system when the state of the vehicle speed is abnormal.

4. The steering control device according to claim 3, wherein the post-adjustment axial force calculator is configured to slowly change a value of the post-adjustment axial force from a value of the first axial force to a value of the second axial force at the time of switching of the valid calculation system from the first calculation system to the second calculation system.

5. The steering control device according to claim 1, wherein the first axial force calculator is configured to adjust the pre-adjustment axial force such that the first axial force is equal to or less than a first upper limit value based on the vehicle speed, and wherein the second axial force calculator is configured to adjust the pre-adjustment axial force such that the second axial force is equal to or less than a second upper limit value.

6. A steering system comprising:
a motor;
a steering unit to which a steering wheel is connected;
a turning unit configured to turn turning wheels, a power transmission path between the steering unit and the turning unit being cut off; and
a steering control device,
wherein the motor is a steering-side motor that applies a motor torque as a steering reaction force against steering which is input to the steering unit,
wherein the steering control device includes a target torque generator configured to generate a target torque which is a target value of the motor torque and a control signal generator configured to generate a control signal for controlling the motor such that the motor torque corresponding to the target torque is generated,
wherein the target torque generator includes a pre-adjustment axial force calculator configured to calculate a pre-adjustment axial force corresponding to an axial force acting on a turning shaft to which turning wheels are connected, a first axial force calculator configured to calculate a first axial force by adjusting the pre-adjustment axial force using a vehicle speed, a second axial force calculator configured to calculate a second axial force by adjusting the pre-adjustment axial force without using the vehicle speed, a post-adjustment axial force calculator configured to calculate a post-adjustment axial force based on the first axial force and the second axial force, and a target torque calculator configured to calculate the target torque based on the post-adjustment axial force,
wherein the target torque generator is configured to generate a target reaction torque which is a target value of the steering reaction force as the target torque, and
wherein the post-adjustment axial force calculator is configured to set a proportion of the first axial force contributing to the post-adjustment axial force to be smaller when a state of the vehicle speed is abnormal than when the state of the vehicle speed is normal.

* * * * *